A. PICKEN.
SPEEDOMETER ALARM.
APPLICATION FILED APR. 10, 1913.
1,104,704.
Patented July 21, 1914.
2 SHEETS—SHEET 1.
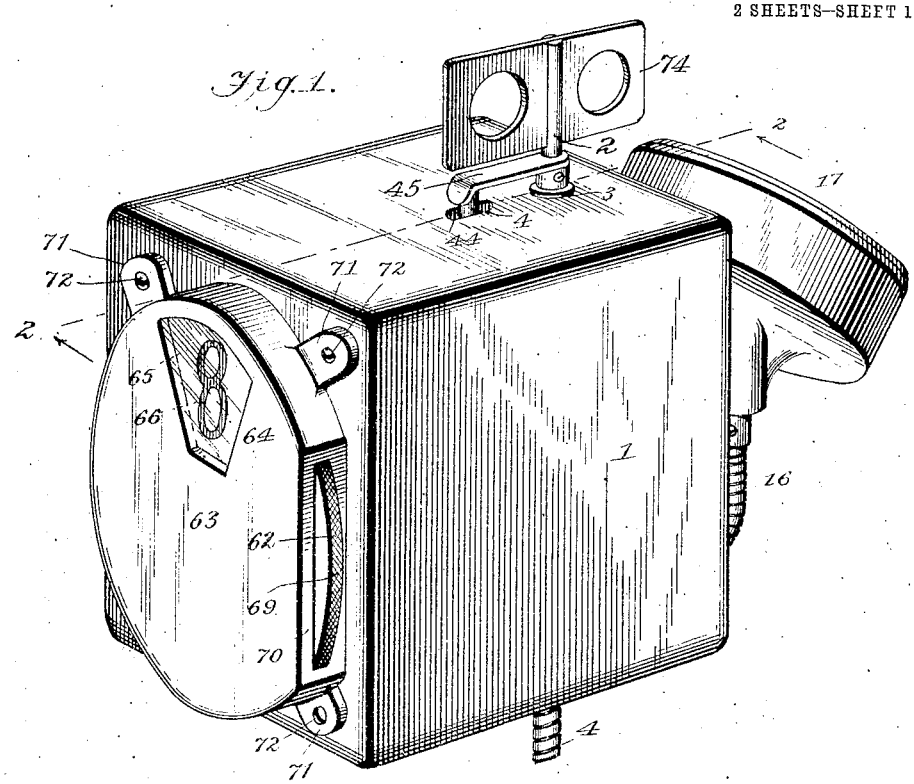
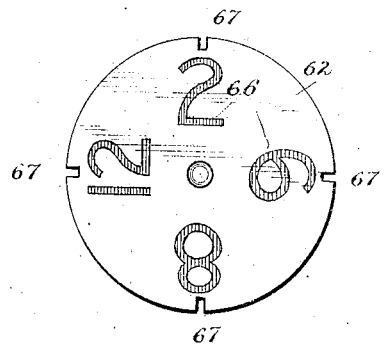
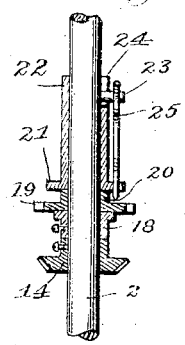
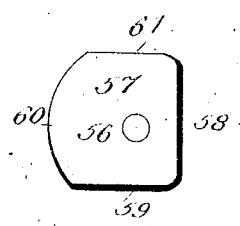
WITNESSES
A. Picken
INVENTOR
BY
ATTORNEY A. PICKEN.
SPEEDOMETER ALARM.
APPLICATION FILED APR. 10, 1913.
1,104,704.
Patented July 21, 1914.
2 SHEETS—SHEET 2.
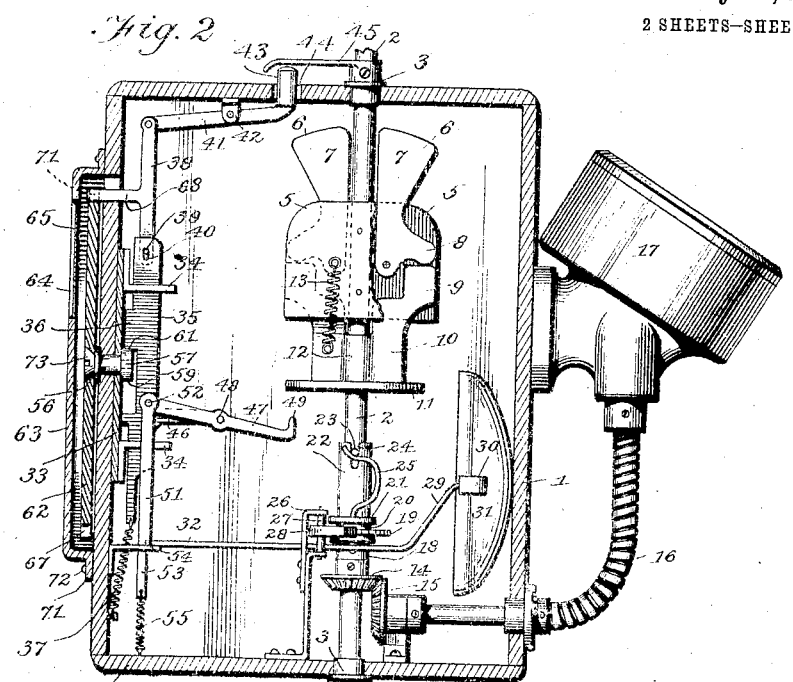
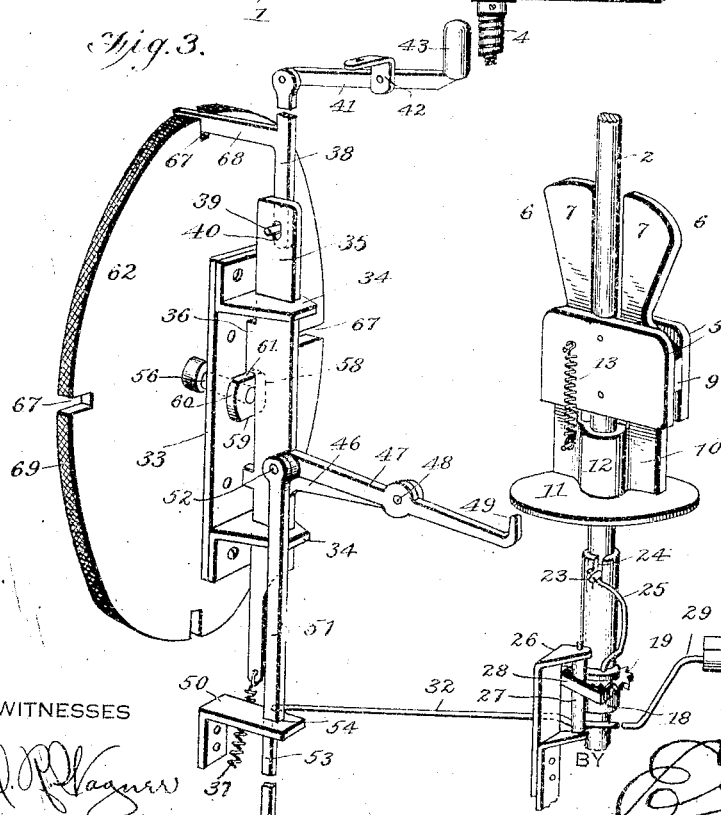
WITNESSES
A. Picken
INVENTOR
BY
ATTORNEY

UNITED STATES PATENT OFFICE.

ARCHIBALD PICKEN, OF NORFOLK, VIRGINIA, ASSIGNOR OF ONE-HALF TO FREDERICK WILLIAM CURD, OF NORFOLK, VIRGINIA.

SPEEDOMETER-ALARM.

1,104,704.

Specification of Letters Patent.

Patented July 21, 1914.

Application filed April 10, 1913. Serial No. 760,303.

*To all whom it may concern:*

Be it known that I, ARCHIBALD PICKEN, a citizen of the United States, residing at Norfolk, in the county of Norfolk and State of Virginia, have invented a new and useful Speedometer-Alarm, of which the following is a specification.

This invention has reference to improvements in speedometer alarms, and its object is to provide a device for use especially on automobiles, whereby an audible alarm is given when a predetermined maximum speed is exceeded.

The present invention is designed to be attached to an automobile which may be taken as typical of any moving structure, whether it be a vehicle or a piece of machinery where it is desirable that a certain maximum speed should not be exceeded. There is provided a suitable casing containing speed responsive mechanism which is arranged to actuate an alarm, but such alarm is locked against actuation until the predetermined maximum speed is reached, when the speed responsive devices cause the release of the alarm to actuation. Since it is quite customary to have different allowable maximum speeds in different places, provision is made for readily setting the device to respond to any one of a number of chosen speeds, while the visible indication of the maximum speed is then locked in the proper position, the means whereby the maximum speed indicator may be released for resetting being accessible exterior to the casing provided for protecting the working parts of the apparatus. Moreover, provision is made for preventing tampering with the speed setting and indicating devices while the vehicle or other moving mechanism is in motion, the protecting device also serving as a means for indicating to an observer the fact that the structure is in working condition.

Since on an automobile it is desirable to have visible evidence of the actual speed, either maximum or less at which the vehicle is traveling, an ordinary speedometer may be provided in a position permitting its being read by the operator, such speedometer being driven by the driving mechanism for the speed responsive device.

The invention will be best understood from a consideration of the following detailed description, taken in connection with the accompanying drawings forming a part of this specification, with the further understanding that while the drawings show a practical embodiment of the invention, the latter is not confined to any strict conformity with the showing of the drawings but may be changed and modified so long as such changes and modifications mark no material departure from the salient features of the invention.

In the drawings:—Figure 1 is a perspective view of a device embodying the present invention. Fig. 2 is a section on the line 2—2 of Fig. 1 with some parts shown in elevation. Fig. 3 is a perspective view of the mechanism of the maximum speed indicating devices and the alarm actuating mechanism with the casing and supports omitted. Fig. 4 is a face view of a disk forming part of the improved device and serving to indicate visibly the maximum speed for which the device is set. Fig. 5 is a detail section of a friction mechanism for imparting motion from the driving shaft to the alarm actuating devices. Fig. 6 is a detail view of a cam structure used in connection with the maximum speed indicating disk.

Referring to the drawings there is shown a casing 1 designed to inclose and protect certain mechanisms but it will be understood that this casing may be replaced by any protective structure and is only employed where the device is in the nature of an attachment to be applied to or removed from the automobile or other machine, while when the operating mechanism of the invention is made a permanent part of a structure, the casing 1 need not be employed, but the other parts may be built in to the structure the predetermined maximum speed of which is to be indicated both audibly and visibly.

Mounted in the casing 1, or in the absence of the casing, in any other support, is a main shaft 2 having bearings 3 near the ends and at one end of the shaft a flexible power transmitting member 4 may be secured for transmitting motion from the moving parts of the machine, the maximum speed of which it is desired to indicate. Where the shaft 2 is suitably located the flexible connection 4 may be omitted and the shaft 2 may be otherwise connected to the moving parts.

Fixed to opposite sides of the shaft 2 at an appropriate place along the length of the shaft are plates 5 between which are mounted angle levers 6 each having one end enlarged or weighted, as indicated at 7, while the other end 8 of each angle lever bears upon an appropriate portion 9 of a plate 10 carrying at the end remote from the angle levers a disk 11, the plate 10 having an intermediate portion 12 surrounding the shaft 2 and forming a sliding bearing thereon for the plate 10 and disk 11. A spring 13 connected at one end to one of the plates 5 and at the other end to the plate 10 serves to hold the plate 10 in a position which will cause the weighted ends 7 of the levers 6 to lie against the shaft 2 on opposite sides thereof, but on a rotation of the shaft 2 at a suitable speed centrifugal force acting on the weights 7 will tend to cause these weights to move outwardly away from the shaft about the pivots of the levers 6 and thereby move the plate 10 lengthwise of the shaft in a direction to extend the spring 13.
The structure just described as mounted on the shaft 2 is in effect a centrifugal governor, and need not of necessity follow the form described, but may be otherwise constructed, for any structure which will become actively responsive to increase in speed to varying extents will answer the purposes of the present invention.

It is not necessary that the shaft 2 should have any particular position, but usually it is placed upright and since this is a convenient position and is the one shown in the drawings the shaft 2 will be considered as an upright shaft in order to locate the relative positions of other parts, but the terms of position will, of course, vary in accordance with the actual position of the shaft 2. With this understanding there is secured to the shaft 2 at a distance below the disk 11 a bevel gear wheel 14 near the bottom of the casing 1, and this bevel gear wheel is in mesh with another bevel gear wheel 15 connected by a motion transmitting shaft 16 to a speedometer 17 merely indicated in the drawings without attempt to show its structure, since the speedometer 17 may be such as is commonly employed in automobiles and is only associated with the other structures of the present invention to provide visible means within the view of an operator of the automobile for indicating the actual speed at which the vehicle is traveling and not simply giving evidence of a predetermined maximum speed. Since the shaft 2 must of necessity be coupled to some moving part of the vehicle the same shaft may be employed for actuating the speedometer 17, thus avoiding duplication of mechanism. Above the gear wheel 14 is a collar 18 fast to the shaft 2 and on the said shaft immediately above the collar 18 is a ratchet wheel 19 having a hub 20 engaged by one end 21 of a sleeve 22 mounted on the shaft 2 to have a limited longitudinal movement thereon and constrained to rotate with the shaft by a pin 23 projecting from the shaft through a longitudinal slot 24 in one end of the sleeve 22. A spring 25 at one end engaging the pin 23 and at the other end carried by the sleeve 22 causes the end 21 of the sleeve 22 to bear frictionally upon the hub 20 and force the ratchet wheel 19 into frictional engagement with the collar 18, so that the ratchet wheel 19 is constrained to rotate with the shaft 2, but if a holding force be applied to the ratchet wheel 19 sufficient to overcome the resistance of the frictional engagement, the ratchet wheel 19 will remain quiescent while the shaft 2 and other parts carried thereby rotate.

Rising from the bottom of the casing 1 or mounted on any suitable support is a bracket 26 carrying an upright arbor 27 to which is made fast an escapement anchor 28 in position to be engaged by the teeth of the ratchet wheel 19, which teeth are similar to those of the ordinary toothed wheel used in alarm mechanism of clocks. The arbor 27 has fast thereto an arm 29 having at the free end a hammer head 30 in position to strike a bell 31 which may be made fast to the inside of the casing 1 or may be otherwise mounted, so that when the arbor 27 is rocked under the action of the ratchet 19 and escapement anchor 28 in the same manner as the alarm mechanism of a clock, the hammer or head 30 will strike a succession of blows on the bell 31, thus producing an audible alarm. The arbor 29 also carries another arm 32 projecting from the arbor in a direction opposite from that of the arm 29, and both arms may be in the form of a rod or wire traversing the arm 29 and made fast thereto and projecting therefrom in opposite directions. These are, however, structural details which may be varied within wide limits.

Fast to the inner wall of the casing 1 or to any other suitable support is an elongated plate 33 provided at suitably spaced points with brackets 34 constituting bearings for a slidable bar 35 projecting at each end beyond the respective brackets 34 and between these brackets having a lateral offset or lug 36 reaching into close relation to the plate 33 for a purpose to be described. The bar 35 extends through the lower bracket 34 for an appropriate distance and there has fast to it one end of a spring 37, the other end of which may be secured to any fixed point, as, for instance, the interior of the casing 1 where the latter is employed. The spring 37 tends at all times to move the bar in one direction which in the structure illustrated is downward.

Pivoted to the upper end of the bar 35 is a link 38, the pivotal connection being shown as comprising a pin 39 on the lower end of the link 38 and extending through a slot or opening 40 in the upper end of the bar 35. The upper end of the link 38 is pivotally connected to one end of a lever 41 pivoted on a bracket 42 which may depend from the top of the casing 1 or may be made fast to any other suitable fixture, and that end of the lever 41 remote from the end connected to the link 38 carries a finger piece 43 which may rise from the lever 41, the latter being substantially horizontal in the structure shown and the parts are so arranged that this finger or push piece 43 extends through an opening 44 in the top of the casing 1 to be there accessible to an operator. Moreover, the push piece 43 is so related to the shaft 2 as to be quite close to this shaft which is of a length to rise above the top of the casing 1 or other covering member and there has fast to it a finger 45 extending lateraly for a sufficient distance to move over the top of the push piece 44 at each revolution of the shaft 2.

The bar 35 between the brackets 34 carries an arm 46 projecting from the bar in a direction opposite from the plate 33 and substantially perpendicular to the length of the bar 35. This arm carries a rock lever 47 at a point between the ends of the lever, said lever being connected to the arm 46 by a pivot pin 48. That end of the lever 47 remote from the bar 35 is provided with an upturned toe 49 within the range of movement of the disk 11 under the action of the levers 6 of the governor under conditions to be described.

Fast to the inner wall of the casing 1, or to any other fixed support, is a bracket 50 at a lower point than the plate 33, and in position to be traversed by a rod 51 pivoted at the upper end to that end of the lever 47 remote from the toe 49, the connection being by means of a pivot pin 52. The rod 51 is reduced in width as shown at 53, where traversing the bracket 50 and thereby forms a shoulder 54 to engage the upper surface of the bracket 50, thus limiting the movement of the rod 51 in one direction, which direction of movement is caused by a spring 55 fast at one end to the reduced end of the rod 51 and at the other end to some fixed structure, such as the casing 1. The arm 32 is of such length and so related to the rod 51 that when this rod has its shoulder 54 in engagement with the bracket 50 such portion of the rod 51 is in the path of the arm 32 in a manner to prevent rocking of the anchor 28, but when the rod 51 is lifted so as to remove the shoulder 54 from the bracket 50 for an appropriate distance, which may be a little more than the thickness of the arm 32, such arm is no longer held by the rod 51 and the anchor 28 will therefore rock or vibrate under the impulse of the ratchet wheel 19.

Traversing the plate 33 at a point between the brackets 34 is an arbor 56 having a suitable bearing in the corresponding wall of the casing 1 through which wall the arbor 56 projects, although, of course, in the absence of the casing 1 this arbor will have a suitable bearing in a fixed structure. At the end of the arbor 56 interior to the plate 33 there is made fast a cam 57 shown separately in Fig. 6, this cam having cam faces 58, 59, 60 and 61 in the particular arrangement shown, but it will be understood that it may have more than four faces or less than four faces, since as will presently appear, the faces determine the speeds which mark the maximum speeds at which the alarm will sound. That end of the arbor 56 remote from the cam 57 carries a disk 62 exterior to the casing 1, but inclosed by a subcasing or shield 63 which may be made fast to the outer face of the corresponding portion of the casing 1, or to any other appropriate fixed structure, and this subcasing 63 is provided with a sight opening 64 which may if desired be covered by a transparent plate 65 of glass or celluloid or other suitable material permitting a view of the corresponding face of the disk 62 back of the sight opening. The disk 62 has produced upon the face visible through the sight opening indications 66 which may be in the form of numerals designating maximum speeds, and these speed indications may correspond in number and position to the several faces of the cam 57. At appropriate points about the edge of the disk are notches 67 in position to be engaged by a finger 68 projecting from the link 38, so that as this link is moved lengthwise in one direction the finger 68 will lodge in an appropriate notch 67 in its path and when moved in the other direction the finger 68 will be removed from the notch, in which latter case the disk 62 may be rotated to display another indication 66 at the sight opening, this movement being facilitated by providing the disk 62 with a milled edge 69, while the sub-casing 63 may have a cut-away portion 70 through which a part of the milled edge is accessible to the finger of an operator.

The subcasing 63 may be made readily removable from the casing 1 as by ears 71 and screws 72, or in any other appropriate manner, and the disk 62 may be secured to the arbor 56 by a screw 73 so as also to be readily removable therefrom to permit change of disks 62 should there be a change in permissible maximum speeds either in the locality where the vehicle is being employed, or where the vehicle is transported to some other locality having different speed regulations.

The lug 36 is so related to the cam 57 as to engage some one of the faces 58 to 61 thereof in accordance with the rotative position of the disk 62, and as the faces of the cam are at different distances from the axis of the cam the bar 35 will be held in different positions of longitudinal adjustment, these different movements being participated in by the arm 46 and lever 47 and as the lever 47 is pivoted to the arm 46 and is normally constrained by the rod 51 and spring 55 the toe 49 will be adjusted into different relative distances from the disk 11, considering the latter as quiescent, in accordance with the different adjustment of the cam 57. When it is desired to change the position of the disk 62 the push piece 43 is actuated in a direction to move the link 38 to lift the finger 68 from the notch 67 it may then engage. This movement of the link 38 causes a corresponding movement of the bar 35 and the lug 36 is carried away from the cam 57. The disk 62 is now free to be rotated and this may be done by engaging the milled edge 69 where projecting through the cut away portion 70 of the subcasing or shield 63, the operator moving the disk until the desired numeral 66 is visible at the sight opening 64. Now on releasing the push piece 43 the spring 37 acts to move the bar 35 and link 38 in a direction to carry the lug 36 into engagement with the cam face in its path and the finger 68 into the notch 67 in its path, the push piece 43 being at the same time projected to a commensurate distance above the top of the casing 1, but always below the path of the finger 45. Under the circumstances described the shoulder 54 is in engagement with the bracket 50 and consequently the rod 51 is in the path of the arm 32.

Suppose, now, that the automobile is traveling, motion is imparted to the shaft 2 and the governor weights 7 will fly out in the usual manner, but if the speed be less than the indicated maximum, the disk 11 will not reach the toe 49 and the rod 51 being still in the path of the arm 32 the anchor 28 will hold the ratchet wheel 19 against rotation, so that the shaft 2 will rotate within the ratchet wheel without actuating the latter. If, now, the maximum speed be reached, or perhaps just exceeded by a slight margin, the disk 11 is brought into engagement with the toe 49 and the lever 47 is rocked on its pivot 48 to an extent to move the rod 51 to carry the shoulder 54 away from the bracket 50, thus leaving a space for the passage of the free end of the arm 32, and this arm being no longer held against movement in turn no longer holds the anchor 28 so that the frictional engagement of the sleeve 22 with the ratchet 19 causes the latter to participate in the rotative movement of the shaft 2 and cause a rocking movement of the anchor 28 which is imparted to the hammer 30 and the latter strikes the bell 31, thus giving a continuous alarm and thereby attracting the attention of observers to the vehicle, so that notice will be taken of the fact that the maximum speed indicated is being exceeded. The operator may also take notice of the alarm and slow down the machine.

If the bar 35 be adjusted to carry the toe 49 closer to the quiescent position of the disk 11, then the alarm will be sounded at a lower speed and if it be adjusted farther away from the disk 11 then the alarm will be sounded at a higher speed. As soon as the speed is reduced the disk 11 is retracted and the spring 55 will return the rod 51 until the shoulder 54 engages the bracket 50 and the rod therefore comes into the path of the arm 32, thus stopping the sounding of the alarm. When the device has been properly set it is desirable that no mischievous or thoughtless person shall change the setting, especially when the machine is running, for otherwise a driver of the machine might unwittingly break a speed ordinance because of the wrongful setting of the device due to tampering therewith. Such change of the setting of the device when in motion is prevented by the finger 45 which passes over the push piece 43 once in each rotation of the shaft 2 and as the rate of rotation of this shaft is quite rapid, it becomes impossible to tamper with the push piece 43 by reason of the sweeping across thereof of the finger 45. At the upper end of the shaft 2 above the finger 45 there may also be secured a display device or target 74, (see Fig. 1,) which will prominently disclose to an observer, such as an officer of the law, that the shaft 2 is in proper motion and thus serves to indicate that the device is in reliable operation, and dependence may therefore be had upon it for giving notice of the liability of exceeding a certain speed limit.

What is claimed is:—

1. In a device for the purpose described, a speed-responsive actuating member, an alarm mechanism in constant connection therewith, a lock for holding the alarm mechanism against participation in a movement of the actuating member, and means controlled by the actuating member for releasing the lock to permit the actuating member to drive the alarm mechanism.

2. In a device for the purpose described, a speed-responsive actuating member, an alarm mechanism in constant frictional engagement with the actuating member, a lock for holding the alarm mechanism against participation in the movement of the actuating member, and means controlled by the actuating member for releasing the alarm mechanism from the lock to permit its participation in the movement of the actuating member due to the frictional engagement therewith.

3. In a device for the purpose described, a rotatable shaft, a centrifugal governor carried thereby, an alarm mechanism having a member frictionally mounted on the shaft to be driven thereby, a lock for holding the alarm mechanism against participation in the movement of the shaft, and controlling means for the lock in the path of the centrifugal member for moving said lock to release the alarm mechanism to participation in the movement of the shaft for the actuation of the alarm.

4. In a device for the purpose described, a rotatable shaft, a ratchet wheel mounted thereon, means for holding the ratchet wheel in constant frictional engagement with the shaft, an anchor escapement in coactive relation to the ratchet wheel, means controlled by the anchor escapement for sounding an alarm, a centrifugal governor carried by the shaft, a lock related to the anchor escapement to hold the latter and through it the ratchet wheel against actuation by the shaft, and means controlling the lock and in the path of the centrifugal governor to move the lock to releasing relation to the anchor escapement.

5. In a device for the purpose described, a rotatable shaft, a centrifugal governor carried thereby, an alarm mechanism in constant frictional engagement with the shaft, a lock for holding the alarm mechanism against movement and responsive to movements of the governor, an adjustable visual indicator of speeds, and means controlled by the adjustable indicator for setting the lock with respect to the governor to be actuated thereby at speeds corresponding to the indicated speeds.

6. In a device for the purpose described, a rotatable shaft, a governor carried thereby, an alarm mechanism in constant frictional engagement with the shaft, a visual speed indicator adjustable to different positions to indicate the different speeds, a cam member controlled by the speed indicator, a slidable member in normal engagement with the cam and adjustable thereby to different positions, a lock member for the alarm mechanism, an actuator for the lock member in the path of the governor, and a carrier for the actuator controlled by the slidable member positioned by the cam.

7. In a device for the purpose described, a rotatable shaft, a centrifugal governor carried thereby, an alarm mechanism in constant frictional engagement with the shaft, a visual speed indicating device, a manually operable member, means between the manually operable member and visual speed indicating device for holding them in different operative relations, a lock for the alarm mechanism, and means carried by the manually operable member for controlling the lock and in turn controlled by the centrifugal governor for releasing the alarm to operation at the speed determined by the setting of the visual indicator.

8. In a device for the purpose described, an audible alarm, a visual indicator, means for actuating the alarm at a predetermined speed, means for setting the alarm actuating mechanism to respond at different predetermined speeds, and means responsive to the movement of the actuating means for preventing the setting of the device to respond to different speeds while in operation.

9. In a device for the purpose described, a rotatable shaft, an audible alarm mechanism controlled thereby, means for setting the mechanism to respond to different speeds, said means being accessible for manual operation, and means carried by the shaft and responsive to the rotative movements thereof and positioned with respect to the manually operable means to prevent actuation of the latter while the parts are in action.

10. In a device for the purpose described, a rotatable shaft, an audible alarm mechanism controlled thereby, means for setting the mechanism to respond to different speeds, said means being accessible for manual operation, and means carried by the shaft and responsive to the rotative movements thereof and positioned with respect to the manually operable means to prevent actuation of the latter while the parts are in action, said last named means comprising a push piece for the manual setting of the device, and a finger carried by the shaft in position to sweep over the push piece at each rotative movement of the shaft.

11. In a device for the purpose described, a rotatable shaft, a centrifugal governor carried thereby, an audible alarm mechanism including an anchor escapement and a ratchet wheel, the latter being carried by the shaft, a friction sleeve on the shaft having means for urging it into constant frictional engagement with the ratchet wheel, a lock member, means carried by the anchor escapement and controlled by the lock member, and means under the control of the governor for moving the lock member out of controlling relation to the anchor escapement.

12. In a device for the purpose described, a rotatable shaft, a centrifugal governor mounted thereon, a ratchet wheel mounted on the shaft, means for connecting the ratchet wheel frictionally with the shaft, an anchor escapement controlled by the ratchet wheel, an alarm giving means controlled by the anchor escapement, an arm carried by the anchor escapement, a slidable lock member movable into and out of engaging relation to the arm, and a member in the path of the centrifugal governor and connected to the lock member for causing a movement of the latter out of the path of the arm on the anchor escapement when a predetermined speed is reached.

13. In a device of the character described, speed responsive means for causing the sounding of the alarm, and means for setting the alarm means to respond to different speeds and to indicate visually the different speeds, comprising a disk having speed indicia thereon and corresponding notches at the margin of the disk, a cam responsive to rotative movements of the disk and having as many cam surfaces as there are speed indicia or notches, a slidable member engaged by the cam, locking means for the disk having a finger for entering the notches in the disk manually operable means for moving the slidable member to unlock the disk and permit its rotation, at will, and means controlled by the slidable member and in position to be actuated by the speed responsive devices to cause the actuation of the audible alarm at the predetermined set speeds.

14. In a device for the purpose described, a rotatable shaft, a centrifugal governor thereon, an alarm mechanism having frictional connection with the shaft for actuation thereby, a lock for holding the alarm mechanism against participation in the movements of the shaft, connections from the lock in position to be engaged by the governor at predetermined speeds to release the alarm, means for indicating visually the different predetermined speeds, a lock member for the visual means, an adjusting means controlled by the visual means for determining the release of the lock at speeds corresponding to the visually indicated speeds, manually operable means for locking and releasing the visual means at will, and indicating means carried by the shaft in position to sweep over the manually operable means to prevent its actuation when the device is in operation.

15. In a device for the purpose described, speed responsive means, means for indicating a predetermined maximum speed, and a visible member constantly actuated by the speed responsive means and in position to indicate to an observer that the device is in operation.

16. In a device for the purpose described, a rotatable shaft, a centrifugal governor carried thereby, means controlled by the centrifugal governor for indicating an excess of predetermined speed, and a constantly visible member carried by the shaft for indicating the operation of the shaft.

In testimony, that I claim the foregoing as my own, I have hereto affixed my signature in the presence of two witnesses.

ARCHIBALD PICKEN.

Witnesses:
 HARRY C. DEULINGER,
 JOHN T. LAWRENCE.